US012693814B2

(12) United States Patent
Tanibe

(10) Patent No.: US 12,693,814 B2
(45) Date of Patent: Jul. 28, 2026

(54) PRINTING SYSTEM, CONTROL METHOD, INFORMATION PROCESSING APPARATUS, AND MEDIUM

(71) Applicant: CANON KABUSHIKI KAISHA, Tokyo (JP)

(72) Inventor: Ryuya Tanibe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 18/443,579

(22) Filed: Feb. 16, 2024

(65) Prior Publication Data

US 2024/0303007 A1 Sep. 12, 2024

(30) Foreign Application Priority Data

Mar. 7, 2023 (JP) ................................. 2023-034929

(51) Int. Cl.
*G06F 3/12* (2006.01)
*G06K 15/02* (2006.01)

(52) U.S. Cl.
CPC ............ *G06F 3/1205* (2013.01); *G06F 3/126* (2013.01); *G06K 15/1823* (2013.01); *G06F 3/12* (2013.01)

(58) Field of Classification Search
None
See application file for complete search history.

(56) References Cited

U.S. PATENT DOCUMENTS

| | | | | |
|---|---|---|---|---|
| 4,724,460 A | * | 2/1988 | Shinyashiki | ......... G03G 15/234 |
| | | | | 399/370 |
| 2005/0141903 A1 | * | 6/2005 | Kwon | ................... G03G 15/553 |
| | | | | 399/24 |
| 2009/0021777 A1 | * | 1/2009 | Yamaguchi | ........ H04N 1/00244 |
| | | | | 358/1.15 |
| 2014/0140747 A1 | * | 5/2014 | Osada | ................ H04N 1/32464 |
| | | | | 399/410 |
| 2017/0371607 A1 | * | 12/2017 | Okada | ................ H04N 1/00344 |

FOREIGN PATENT DOCUMENTS

JP 2018106329 A 7/2018

* cited by examiner

*Primary Examiner* — Darryl V Dottin
(74) *Attorney, Agent, or Firm* — VENABLE LLP

(57) ABSTRACT

A printing system includes a first information processing apparatus that performs a first print service, and a second information processing apparatus that performs a second print service. The first print service obtains a maximum print amount and a current print amount from the second print service, and executes the print job if it determines that a total print amount and the current print amount do not exceed the maximum print amount. The first print service obtains a property to be used as the maximum print amount from the second print service, and if the property is a unique property of the second print service, obtains a print amount using a calculation formula according to a condition under which the calculation formula is to be applied for calculating the maximum print amount and the current print amount from a common property which is in common with the second print service.

14 Claims, 12 Drawing Sheets

FIG. 1

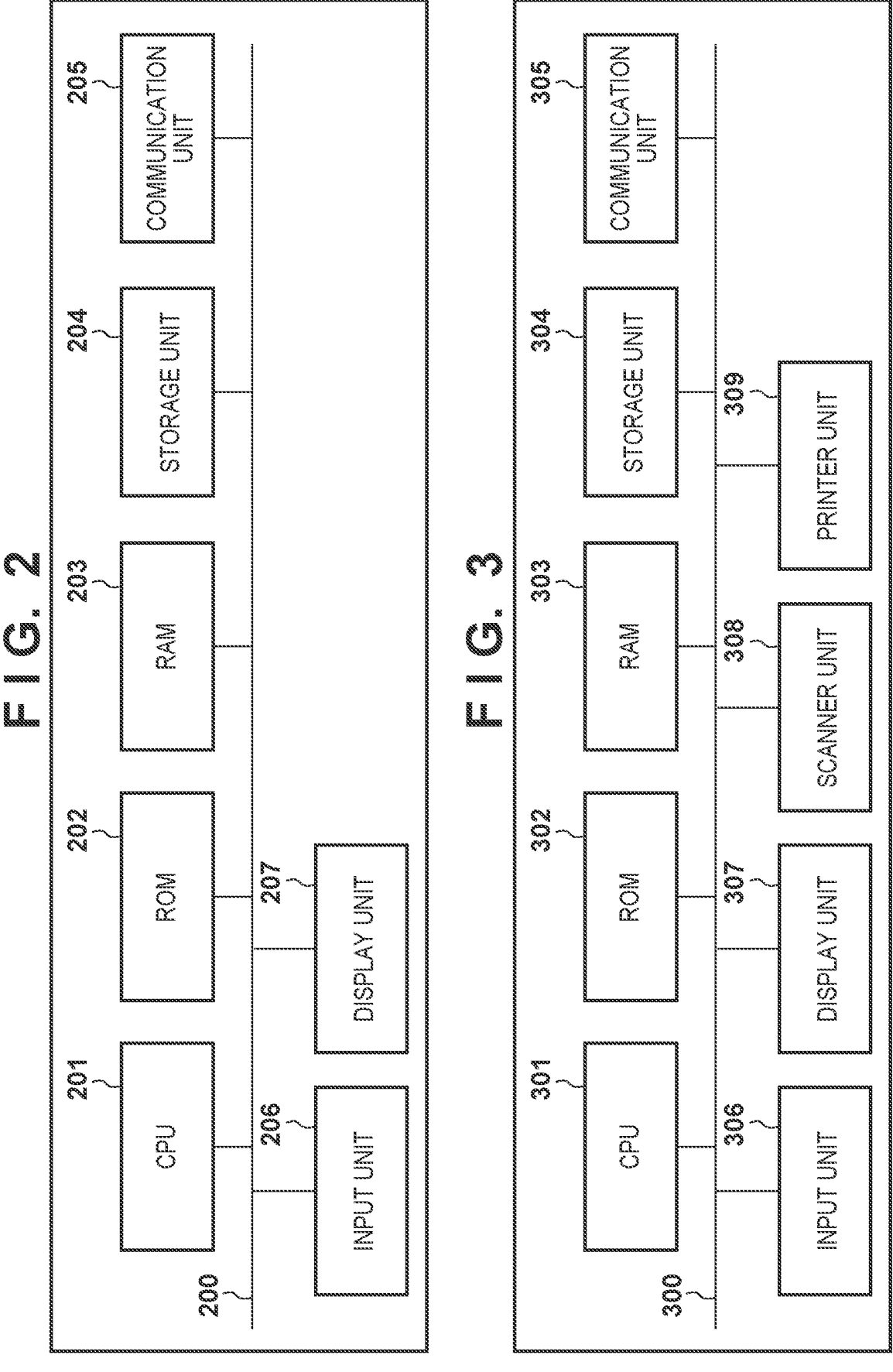
F I G. 2
F I G. 3

F I G. 4
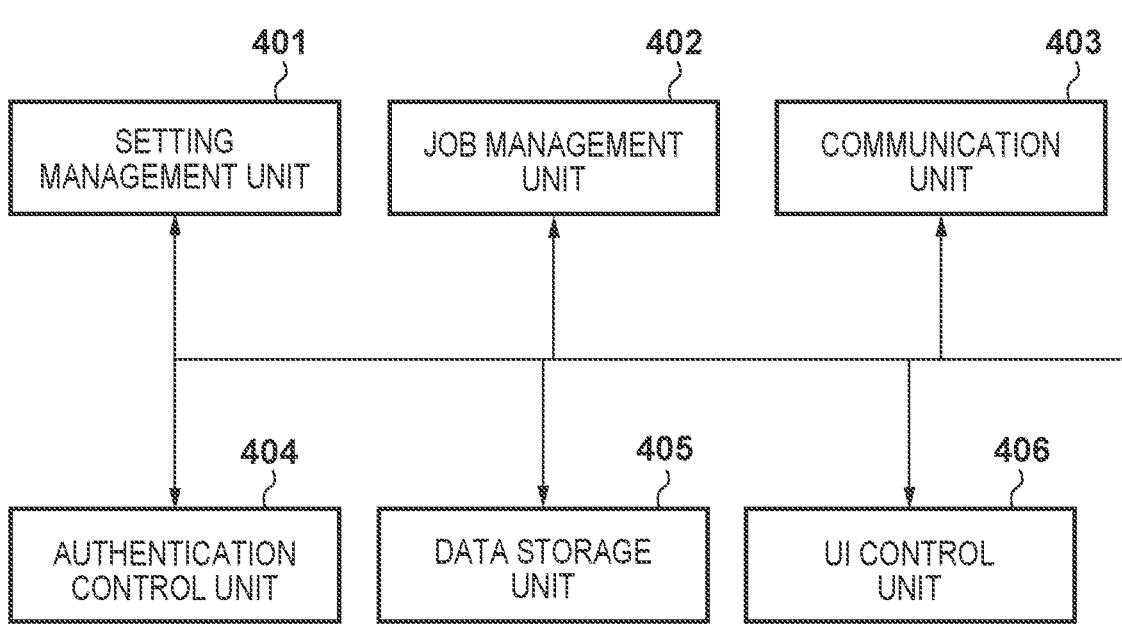

| USER ID | MAXIMUM NUMBER OF SHEETS TO BE PRINTED | NUMBER OF SHEETS USED FOR PRINTING | LINKAGE | LINKED CPS |
|---------|---------|---------|---------|---------|
| USER A | 200 | 150 | PRESENT | xxxxx |
| — | — | — | — | — |

F I G. 8
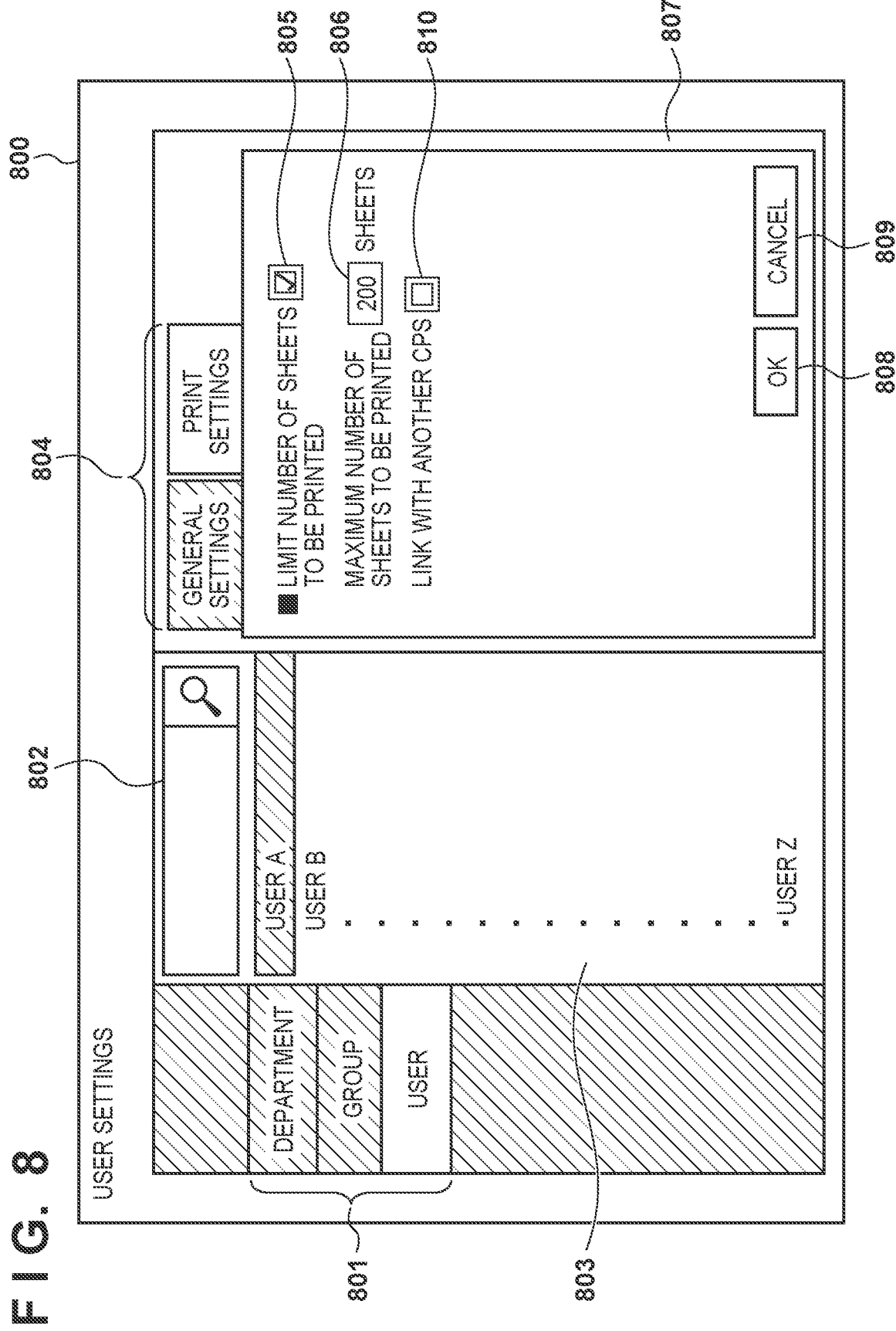

F I G. 9

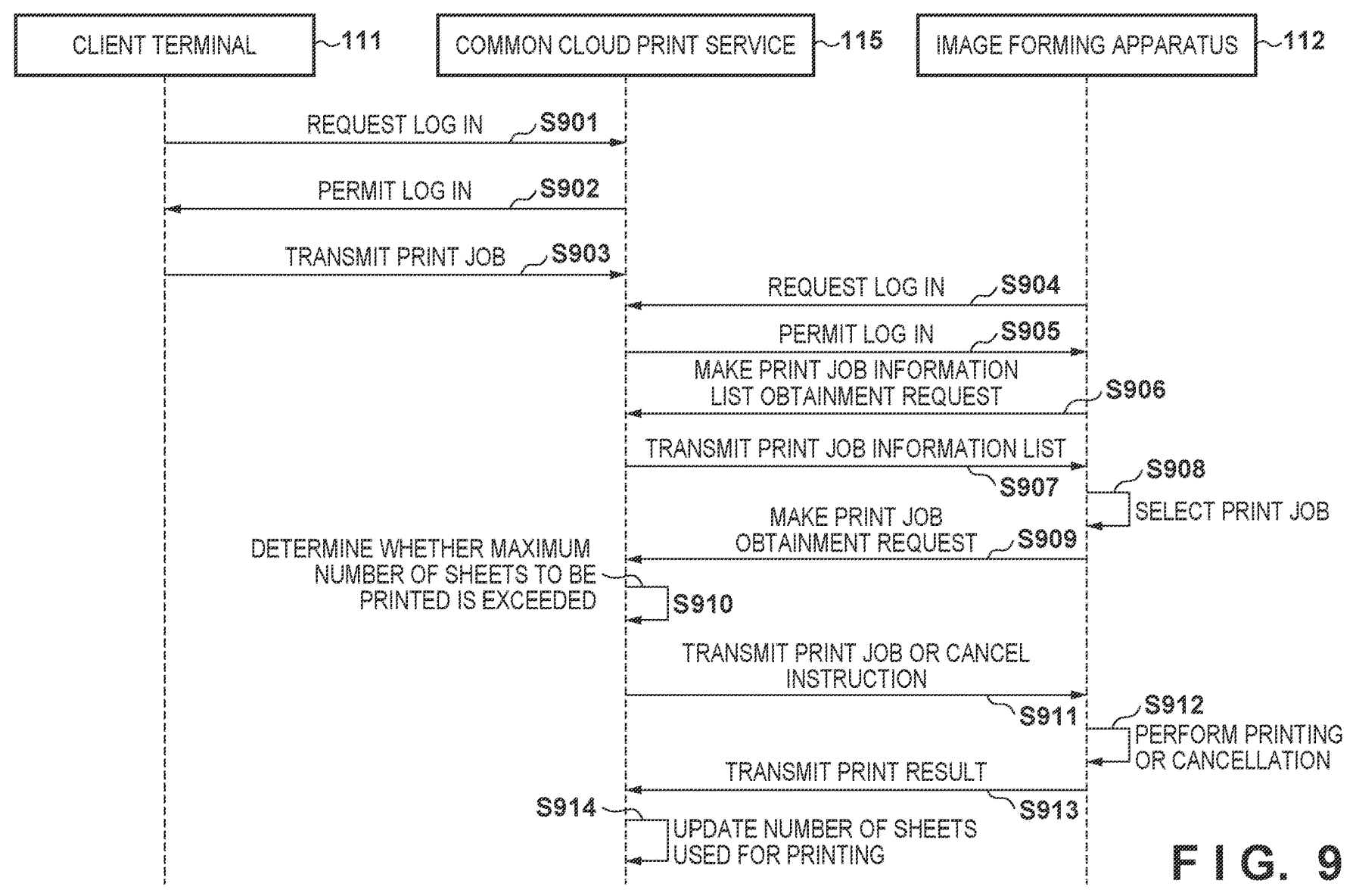

CLIENT TERMINAL ~111

COMMON CLOUD PRINT SERVICE ~115

IMAGE FORMING APPARATUS ~112

REQUEST LOG IN  S901

PERMIT LOG IN  S902

TRANSMIT PRINT JOB  S903

REQUEST LOG IN  S904

PERMIT LOG IN  S905

MAKE PRINT JOB INFORMATION LIST OBTAINMENT REQUEST  S906

TRANSMIT PRINT JOB INFORMATION LIST  S907

SELECT PRINT JOB  S908

MAKE PRINT JOB OBTAINMENT REQUEST  S909

DETERMINE WHETHER MAXIMUM NUMBER OF SHEETS TO BE PRINTED IS EXCEEDED  S910

TRANSMIT PRINT JOB OR CANCEL INSTRUCTION  S911

PERFORM PRINTING OR CANCELLATION  S912

TRANSMIT PRINT RESULT  S913

UPDATE NUMBER OF SHEETS USED FOR PRINTING  S914

F I G. 10
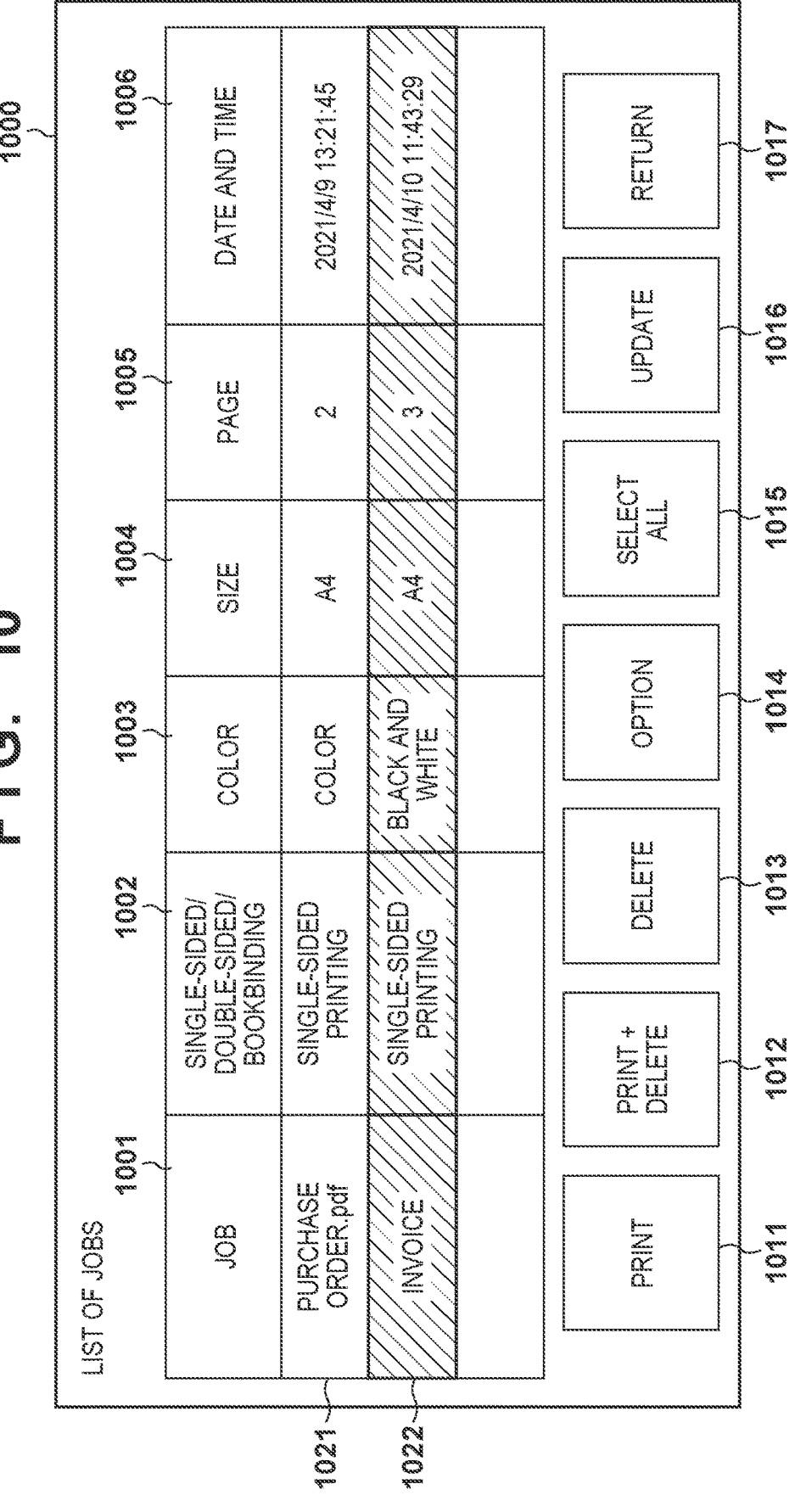

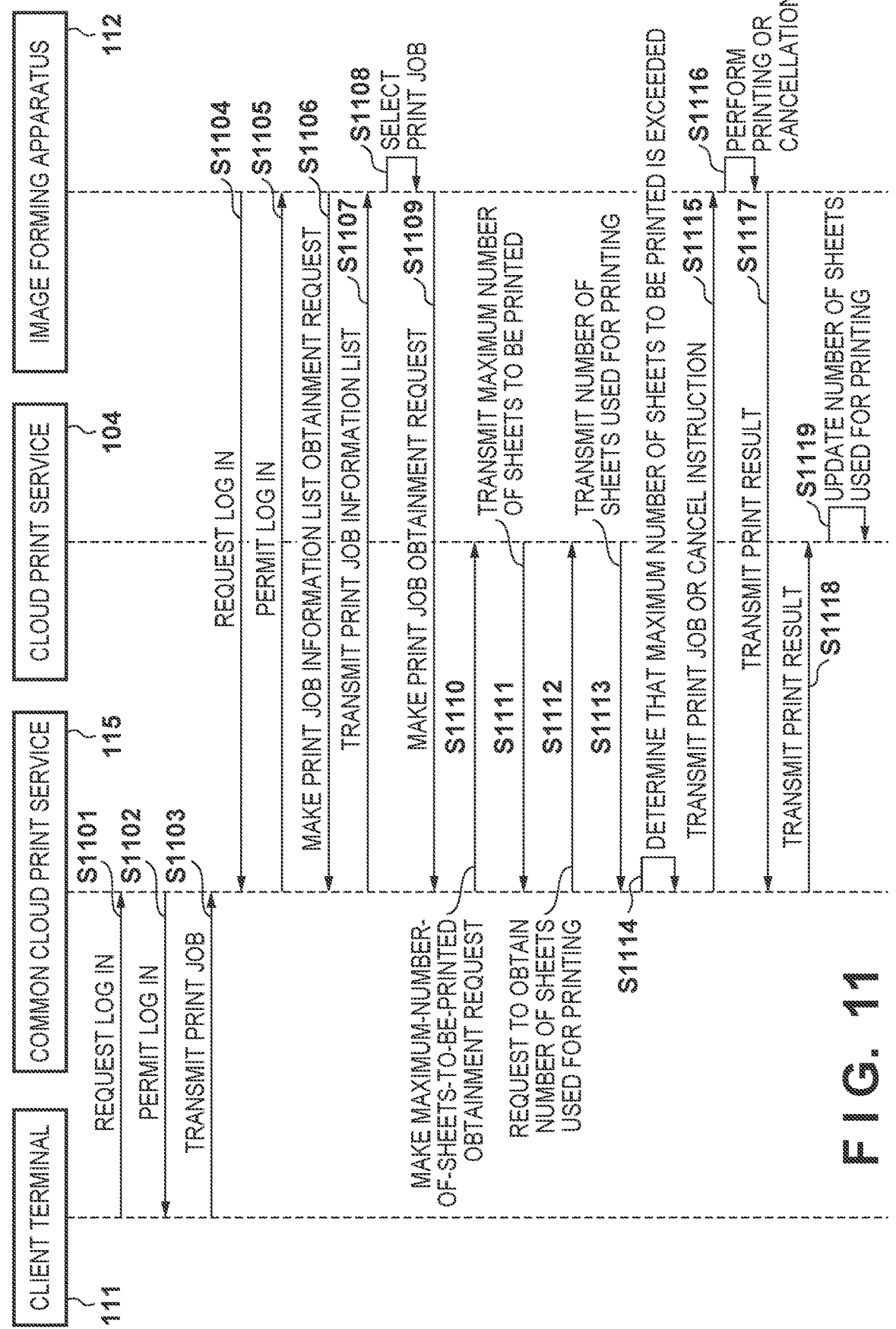
F I G. 11

F I G.  12A

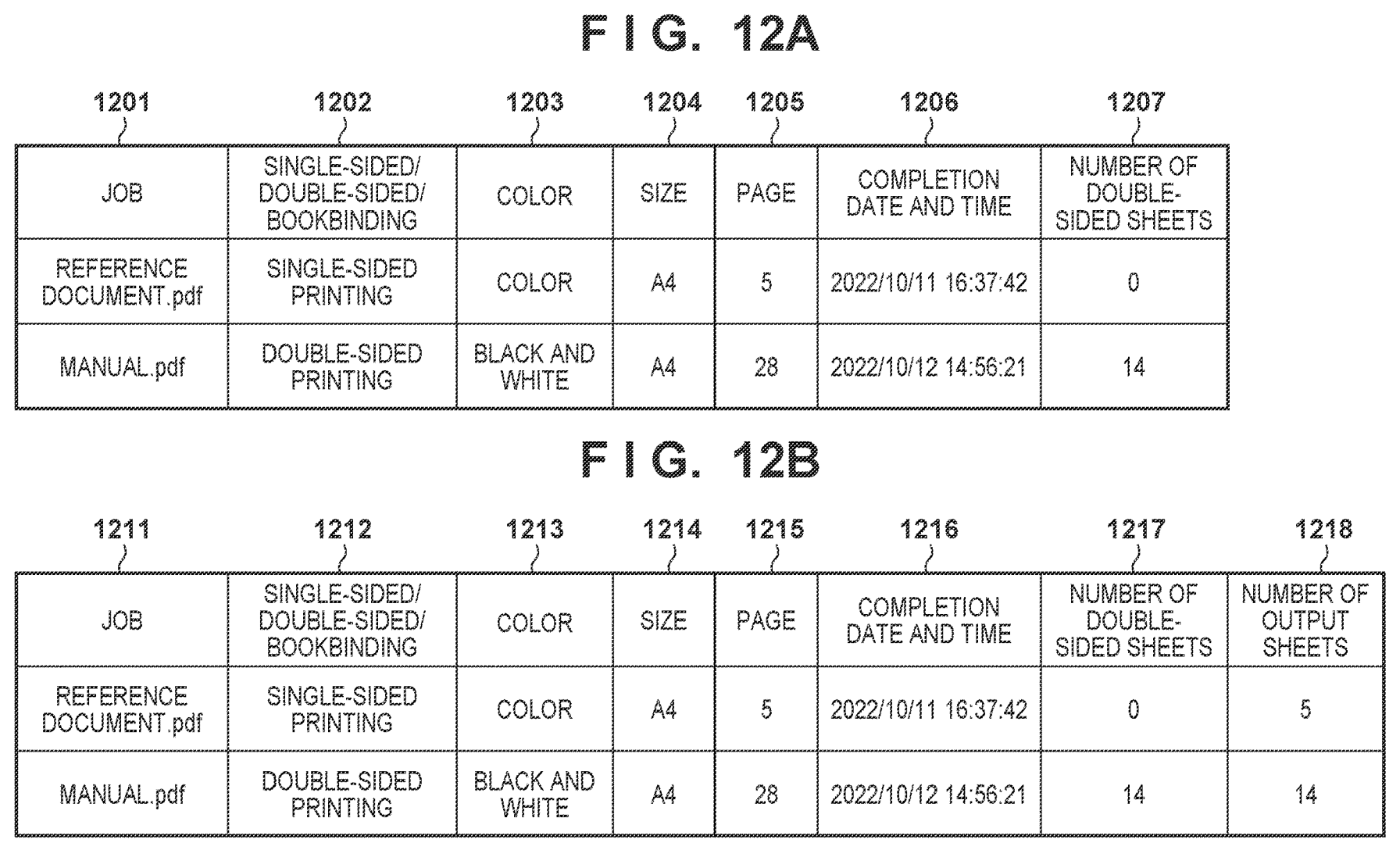

| JOB | SINGLE-SIDED/ DOUBLE-SIDED/ BOOKBINDING | COLOR | SIZE | PAGE | COMPLETION DATE AND TIME | NUMBER OF DOUBLE- SIDED SHEETS |
|---|---|---|---|---|---|---|
| | 1202 | 1203 | 1204 | 1205 | 1206 | 1207 |
| REFERENCE DOCUMENT.pdf | SINGLE-SIDED PRINTING | COLOR | A4 | 5 | 2022/10/11 16:37:42 | 0 |
| MANUAL.pdf | DOUBLE-SIDED PRINTING | BLACK AND WHITE | A4 | 28 | 2022/10/12 14:56:21 | 14 |

1201

F I G.  12B

| JOB | SINGLE-SIDED/ DOUBLE-SIDED/ BOOKBINDING | COLOR | SIZE | PAGE | COMPLETION DATE AND TIME | NUMBER OF DOUBLE- SIDED SHEETS | NUMBER OF OUTPUT SHEETS |
|---|---|---|---|---|---|---|---|
| | 1212 | 1213 | 1214 | 1215 | 1216 | 1217 | 1218 |
| REFERENCE DOCUMENT.pdf | SINGLE-SIDED PRINTING | COLOR | A4 | 5 | 2022/10/11 16:37:42 | 0 | 5 |
| MANUAL.pdf | DOUBLE-SIDED PRINTING | BLACK AND WHITE | A4 | 28 | 2022/10/12 14:56:21 | 14 | 14 |

1211

PRINTING SYSTEM, CONTROL METHOD, INFORMATION PROCESSING APPARATUS, AND MEDIUM

BACKGROUND

Field

The present disclosure relates to printing in cloud print services, particularly to a printing system, a control method, an information processing apparatus, and a medium.

Description of the Related Art

Recently, cloud print services in which print jobs are inputted via the cloud and transmitted to image forming apparatuses have started to become popular. In cloud print services, print jobs transmitted from clients to cloud print services and held can be obtained and executed by registered image forming apparatus. This has the advantage of increasing flexibility in where users perform printing.

Meanwhile, there are techniques for limiting the number of sheets to be printed by setting upper limits to printing by users. For example, Japanese Patent Laid-Open No. 2018-106329 proposes a method of determining whether a user from a first school exceeds their maximum number of sheets to be printed when performing printing using a printing apparatus of a second school.

In Japanese Patent Laid-Open No. 2018-106329, a local print management server and a cloud print management server of each school holds an upper limit and print records for each user. When printing, whether it be print data of a local print management server or print data of a cloud print management server, the print records are updated on both print management servers. It is described that, with this, the upper limits of printing are managed without distinction between local printing and cloud printing.

However, in this case, if there is an inconsistency in the upper limits or print records managed by a cloud print management server and a local print management server, the management of upper limits may not function properly.

SUMMARY

The present disclosure collectively performs limitation to be applied to a user such that there is no inconsistency between a plurality of cloud print services when the user uses the plurality of cloud print services.

The present disclosure has the following configuration. That is, according to one aspect thereof, a printing system comprising: a first information processing apparatus including at least one memory storing at least one first program, and at least one first processor; a second information processing apparatus connected with the first information processing apparatus, the second information processing apparatus including at least one memory storing at least one second program, and at least one second processor; and an image forming apparatus connected with the first information processing apparatus, wherein the at least one first processor reads the at least one first program from the at least one first memory and executes it to perform a first print service configured to store a print job, the at least one second processor reads the at least one second program from the at least one second memory and executes it to perform a second print service, the second print service holds a maximum print amount and a current print amount, and the first print service when the image forming apparatus executes the print job, obtains the maximum print amount and the current print amount from the second print service, determines whether a total of a print amount according to the print job and the current print amount exceeds the maximum print amount, and if the total of the print amount according to the print job and the current print amount does not exceed the maximum print amount, causes the image forming apparatus to execute the print job is provided.

According to another aspect, a first information processing apparatus comprising: at least one memory storing at least one first program; and at least one first processor, wherein the at least one first processor reads the at least one first program from the at least one first memory and executes it to perform: holding a print job; when an image forming apparatus connected to the first information processing apparatus executes the print job, obtaining a maximum print amount and a current print amount from a second information processing apparatus; determining whether a total of a print amount according to the print job and the current print amount exceeds the maximum print amount. in a case where the total of the print amount according to the print job and the current print amount does not exceed the maximum print amount, causing the image forming apparatus to execute the print job is provided.

According to the present disclosure, it is possible to collectively perform limitation to be applied to a user such that there is no inconsistency between cloud print services when that user uses a plurality of cloud print services.

Further features of the present disclosure will become apparent from the following description of exemplary embodiments with reference to the attached drawings.

BRIEF DESCRIPTION OF THE DRAWINGS

FIG. 1 is diagram of a basic configuration for when a system of a plurality of cloud print services is used.

FIG. 2 is a hardware configuration of a client apparatus.

FIG. 3 is a hardware configuration of an image forming apparatus.

FIG. 4 is a block diagram illustrating an example of a software configuration of a cloud print service.

FIG. 8 is a diagram illustrating an example of a UI in which user settings are performed.

FIG. 9 is a sequence diagram illustrating print processing of the common cloud print service.

FIG. 10 is a diagram illustrating an example of a UI in which a list of print jobs is displayed.

FIG. 11 is a sequence diagram illustrating print processing for when the common cloud print service and the cloud print service are linked.

FIGS. 12A and 12B are diagrams illustrating examples of information that the common cloud print service and the cloud print service handle as print results.

DESCRIPTION OF THE EMBODIMENTS

Figure 5:
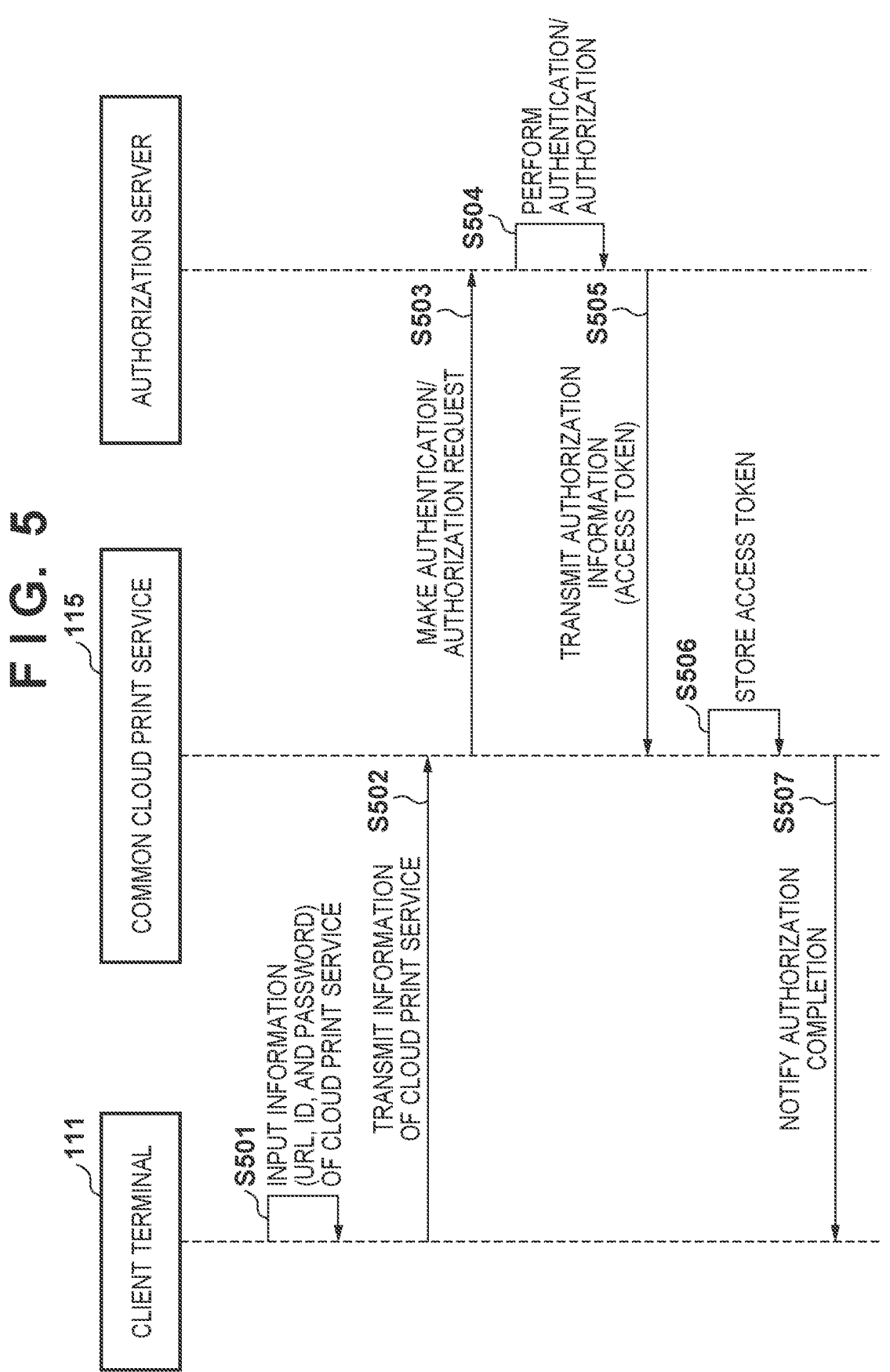
FIG. 5 is a sequence diagram illustrating common cloud print service-to-cloud print service authentication/authorization processing.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
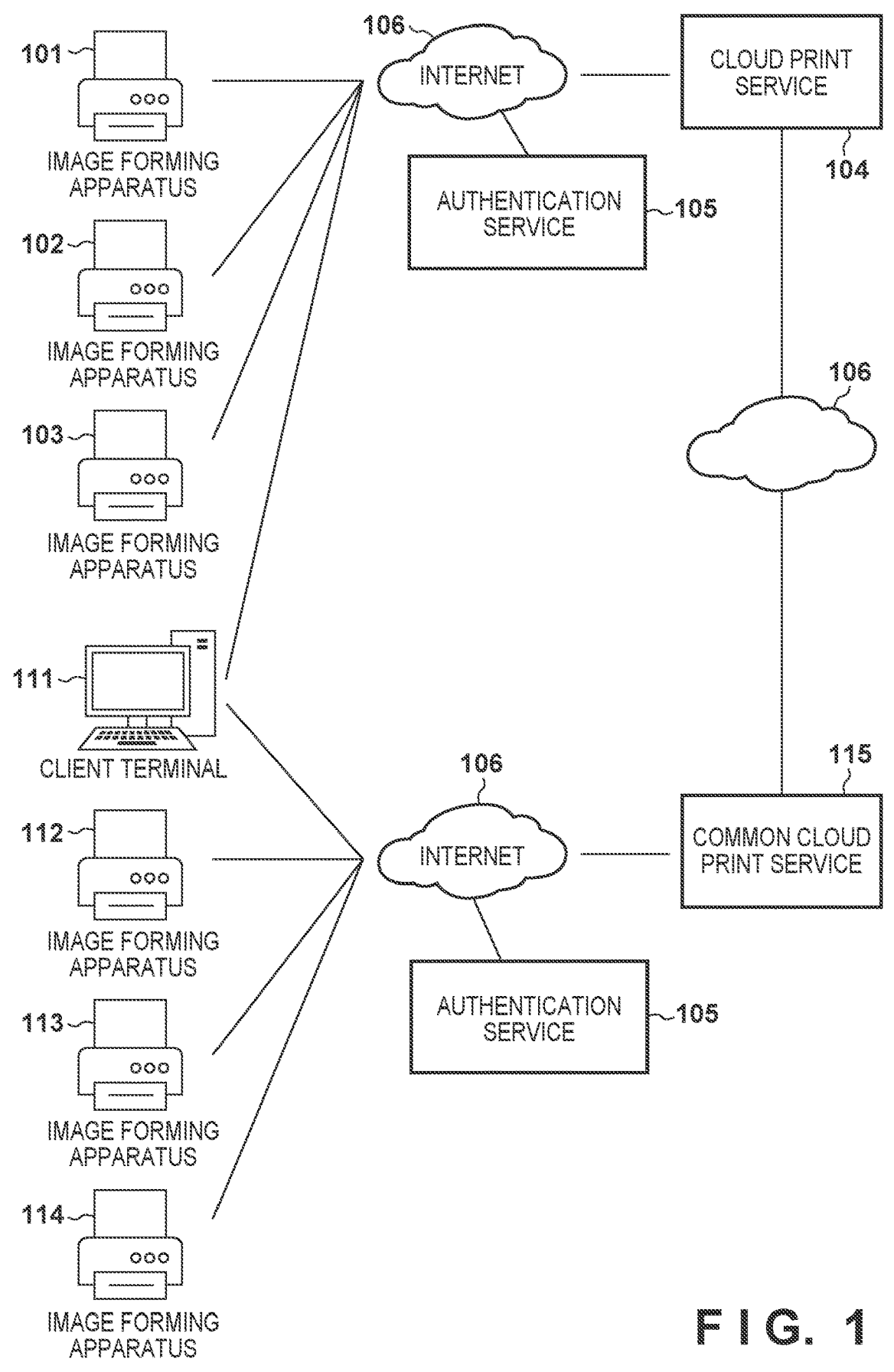

First, a first embodiment of the disclosure will be described.
<System Configuration>
FIG. 1 illustrates a system configuration for when a cloud print service (hereinafter, sometimes referred to as CPS) is used at an office or a school and a common CPS 115 is used outside of the office or the school, for example.

In FIG. 1, respective elements, such as image forming apparatuses and CPSs, are connected by networks that include the Internet 106 so as to be capable of communication. A network may be, for example, any of a local area network (LAN), a wide area network (WAN), a telephone line, a dedicated digital line, an ATM, and the like or a communication network realized by a combination thereof. The network need only be capable of transmitting and receiving data and may include other types of media, such as a wireless LAN, LTE, NR, and satellite communication. A CPS is a service executed by a cloud print server but, in the present embodiment, is equivalent to a server that provides that service, and the service and the server are not particularly distinguished.

In FIG. 1, a client terminal 111 and image forming apparatuses 101, 102, and 103 belonging to one tenant are registered in a CPS 104. An authentication service 105 that authenticates access to the CPS 104 may be included. The role of the authentication service 105 may also be fulfilled by the CPS 104. A tenant is a unit of management in which a CPS manages users, and even if a plurality of tenants are registered in a CPS, each tenant may be treated as a virtual printing system that only includes resources related to that tenant. Therefore, in the present embodiment, description will be given focusing on one tenant.

In the configuration of FIG. 1, when the CPS 104 is used to perform printing, a print job is inputted to the CPS 104 from the client terminal 111. The image forming apparatuses 101, 102, and 103 can obtain the print job from the CPS 104 and execute print processing. The image forming apparatuses 101, 102, and 103 are products of the same printer manufacturer, and the CPS 104 supports functions unique to the printer manufacturer (i.e., a service that specializes in unique functions) and thus allows that service to be used.

The client terminal 111 and image forming apparatuses 112, 113, and 114 are registered in the common CPS 115. They also belong to one tenant managed by the common CPS 115. An authentication service 116 that authenticates access to the common CPS 115 may be included. The role of the authentication service 116 may also be fulfilled by the common CPS 115.

When the common CPS 115 is used to perform printing, a print job is inputted to the common CPS 115 from the client terminal 111. The image forming apparatuses 112, 113, and 114 each can obtain a print job from the common CPS 115 and execute print processing. The image forming apparatuses 112, 113, and 114 need not be manufactured by a particular manufacturer and can be connected to the common CPS 115. The common CPS 115 does not support a service that specializes in functions unique to the manufacturers of respective image forming apparatuses and thus only allow use of a service that is common to image forming apparatuses of different manufacturers.

In this configuration, in the present embodiment, information may be obtained, for example, by the CPS 104 being accessed from the common CPS 115. In such cases, authentication of the common CPS 115 by the CPS 104 can be realized by user privileges being transferred to the common CPS 115 using an authentication/authorization mechanism, such as OAuth.
<Hardware Configuration>
FIG. 2 is a block diagram illustrating an example of a hardware configuration of the client terminal 111, the common CPS 115, and the CPS 104, which are illustrated in FIG. 1. A hardware configuration of a typical information processing apparatus can be applied to the client terminal and the servers of the present embodiment.

A CPU 201 comprehensively controls all of the respective pieces of hardware and executes respective functions, such as printing and scanning, by controlling respective units connected to a bus 200. A ROM 202 is a data read-only memory and, for example, stores a basic control program of the client terminal or the image forming apparatus. A RAM 203 is a memory to and from which data can be written and read and is used, for example, as a working memory of the CPU 201.

A storage unit 204 is used as a storage region of temporary data for when respective programs are being executed and permanent data. For example, although an HDD is often used, the storage unit 204 may be a device capable of loading an external medium, such as an SSD, a CD, a DVD, and a memory card, and writing and reading data thereto and therefrom.

A communication unit 205 connects the client terminal 111, the image forming apparatus 112, 113, 114, 101, 102, or 103, the common CPS 115, or the CPS 104 to a LAN and the Internet, and allows TCP/IP-based data communication between the apparatuses.

An input unit 206 is an operation unit for accepting text and data input operations by a user and is, for example, a keyboard, a mouse, a physical key, and a touch panel. A display unit 207 is a device for displaying various kinds of screens and is, for example, a liquid crystal display or a touch panel. The user issues instructions via the input unit 206 on a user interface screen displayed on the display unit 207 of the client terminal 111 and issues job execution instructions to the common CPS 115 and the CPS 104.

FIG. 3 is a block diagram illustrating an example of a hardware configuration of the image forming apparatuses 112, 113, 114, 101, 102, and 103, which are illustrated in FIG. 1. A bus 300 to a display unit 307 is similar to the bus 200 to the display unit 207 of FIG. 2. In the image forming apparatuses 112, 113, 114, 101, 102, and 103, a scanner unit 308 and a printer unit 309 are also connected to the bus 300.
<Software Configuration>
FIG. 4 is a block diagram illustrating an example of a software configuration of the common CPS 115 and the CPS 104 according to a first embodiment. The software configuration described in FIG. 4 is realized, for example, by the CPU 201 reading out to the RAM 203 a program stored in the storage unit 204 or the ROM 202 and executing the program.

A setting management unit 401 stores settings related to various kinds of functions of the CPS 104 or 115 in respective storage units, such as the storage unit 204 and the RAM 203, and reads out the settings from the respective storage units. The storage units may be included in a data storage unit 405. The settings to be managed include settings such as an upper limit value for each user.

A job management unit 402 stores print jobs received from the client terminal 111 in the data storage unit 405. A list of print jobs or a print job stored in the data storage unit 405 is transmitted to an image forming apparatus in response to a request. A communication unit 403 communicates with other apparatuses via a network, such as the Internet.

An authentication control unit 404 authenticates a user accessing the server. In addition, a token can be issued for the purpose of transferring authenticated user privileges to another user, for example. Furthermore, a user can be authenticated using the issued token. When an authentication server performs user authentication, the authentication control unit 404 performs authentication via the authentication server.

The data storage unit 405 stores, for example, print jobs received from a client. A print record (number of printed sheets) for each user may also be stored in the data storage unit 405. A UI control unit 404 displays a setting screen of FIG. 8, a job list screen of FIG. 10, and the like and a setting screen of FIG. 14 of a second embodiment and the like and executes control for accepting input from these screens.

<Authentication Procedure>

FIG. 5 illustrates a sequence in which an authentication/authorization mechanism is used to obtain an access token for the common CPS 115 to obtain information from the CPS 104. This sequence is performed prior to a later-described sequence of FIG. 11, particularly access from the common CPS 115 to the CPS 104 in step S1110. The authentication server 116 may serve as an authorization server of FIG. 5.

First, the user inputs information of the CPS 104 (e.g., a URL, an ID, and a password of the CPS 104) on the client terminal 111 (step S501) and transmits it to the common CPS 115 (step S502).

The common CPS 115 transmits the received information to the authorization server (step S503). The authorization server performs authentication/authorization processing based on the received information (step S504). If authorization is successful, the authorization server transmits authorization information (access token) to the common CPS 115 (step S505). The common CPS 115 stores the received access token (step S506) and notifies the client terminal 111 that authorization has been completed (step S507). The CPS 104 authenticates the user who presented the access token. Thereafter, the common CPS 115 can access the CPS 104 using the obtained access token. With this, it becomes possible for the common CPS 115 to issue processing execution instructions to the CPS 104.

A configuration may be taken such that, when the user accesses the CPS 104 from the client terminal 111, the CPS 104 that authenticated the user or the authentication server 105 issues an access token. The access token may be transmitted to the common CPS 115, and the common CPS 115 may access the CPS 104 using the access token.

<Setting Maximum Number of Sheets to be Printed>

Figures 6, 7:
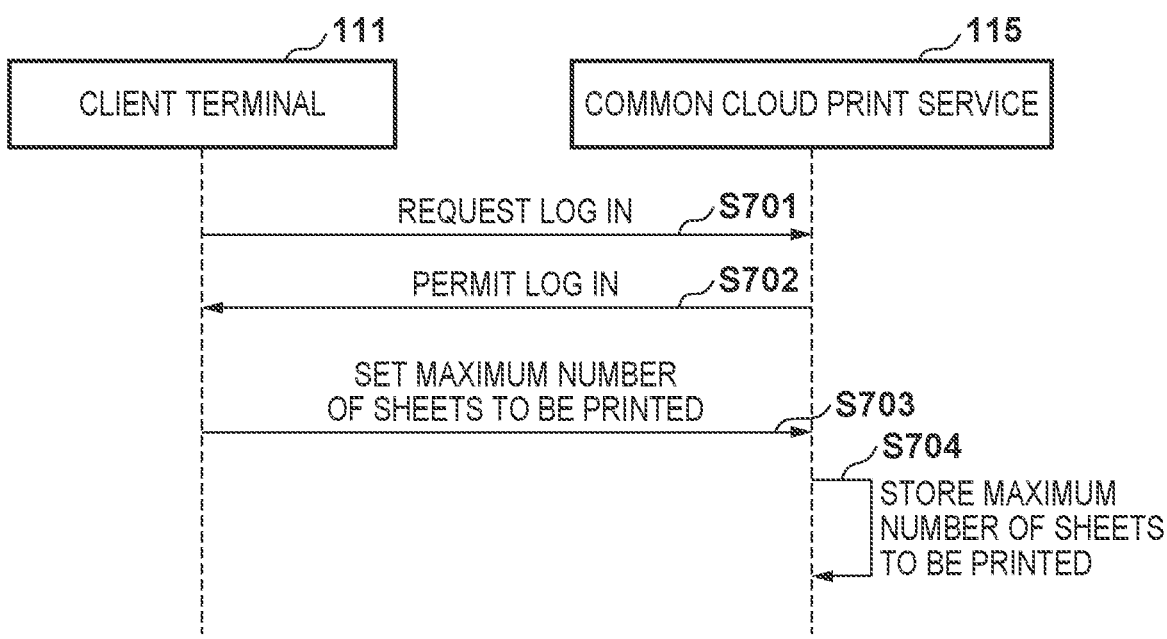
FIG. 6 is a diagram illustrating an example of upper limit setting value and print record value data.
FIG. 7 is a sequence diagram illustrating processing for setting a maximum number of sheets to be printed in a common cloud print service.

FIG. 6 illustrates an example of a table that the CPSs 104 and 115 or only the CPS 104 holds in the setting management unit 401 to manage a maximum number of sheets to be printed for each user. The maximum number of sheets to be printed can be said to be a maximum print amount. This table (also referred to as an upper limit management table 600) is composed with a record (for which a user ID, an upper limit setting value, the number of used sheets to be printed (record value), presence or absence of linkage with another CPS, and an ID (address) of the link destination CPS have been associated for each user) as a unit. Each of these fields need not be held in this manner in which they are grouped into a table, but even in that case, they are held such that they can be associated for each user, and thus, logically, the upper limit management table of FIG. 6 is formed. Here, the maximum number of sheets to be printed (upper limit setting value) and the number of sheet used for printing may simply be the number of pages for the sake of descriptive convenience, but for example, the upper limit setting value and the record value may be managed for each size or for each category, such as for each of black and white/color printing. The user may be a unit to which a user ID has been assigned.

The upper limit management table of FIG. 6 need not be managed for each user. In that case, one table is used in common for all users. Further, for example, management may be performed in units of departments and the like into which users have been grouped. In that case, the department to which the user belongs is identified, and the upper limit management table of that department is applied. In addition, management may be performed using both, and management may be performed such that the number of used sheets does not exceed either one of the upper limits.

FIG. 7 illustrates a flow of setting a maximum number of sheets to be printed for when the user performs printing outside of the office using the common CPS 115. In addition, a setting of a maximum number of sheets to be printed for when the CPS 104 is used to perform printing at the office can be expressed by a flow for which the common CPS 115 of FIG. 7 has been replaced with the CPS 104.

In step S701 and step S702, an administrator user inputs information for logging into the common CPS 115 on the client terminal 111 and logs into the common CPS 115.

In step S703, the administrator user sets a maximum number of sheets to be printed from a user setting UI (FIG. 8) provided by the UI control unit 406 of the common CPS 115 via the client terminal.

In step S704, the common CPS 115 stores the maximum number of sheets to be printed set in step S703 in the setting management unit 401.

FIG. 8 is an example of a user setting screen for setting a maximum number of sheets to be printed. A user setting screen 800 may be, for example, screen information that the client terminal 111 received from the setting target CPS 115 and displayed as it is or may be prepared and displayed in the client terminal 111. On the user setting screen 800, the administrator can perform user settings to be managed by the common CPS 115.

In tabs 801, department, group, or user can be selected, and a user list display field 803 can be switched according to the tab. If a department tab is selected in the tabs 801, a list of departments managed in the common CPS 115 and a setting field 807 of the department will be displayed. If a group tab is selected in the tabs 801, a list of groups managed in the common CPS 115 and a setting field 807 of the group will be displayed. If a user tab is selected in the tabs 801, a list of users managed in the common CPS 115 and a setting field 807 of the user will be displayed. In the user list 803, a list is displayed in units selected in the tabs 801. By inputting a character string in a search bar 802 and executing the search, it is possible to display only relevant items in the user list 803. Settings for the user selected in the user list 803 can be made in the setting field 807.

Setting item tabs 804 allow switching of setting items, and if general settings is selected in the setting item tabs 804, settings (not illustrated) for user-related information, such as a user name and address and an affiliated department, are displayed and can be edited.

If print settings is selected in the setting item tabs 804, print settings related to the user selected in the user list 803 can be set. A check box 805 allows a setting as to whether to limit the number of sheets to be printed. If the check box 805 is checked, a number can be entered in a maximum number-of-sheets-to-be-printed input field 806 or a check box 810 can be checked, and the maximum number of sheets to be printed can be set or the maximum number of sheets to be printed of another CPS can be referenced. By a press of an OK button 808, it is possible to reflect the user's print settings. When a cancel button 809 is pressed, display is updated to that of the current settings without reflection of the user's print settings.

In response to a press (touching) of the OK button 808, a value inputted into the maximum number of sheets to be printed 806 is stored as an upper limit setting value in a record of a corresponding user in the upper limit management table 600. If the check box 810 is checked, "link" is stored in a linkage-with-other-CPS field in a record of a corresponding user in the upper limit management table 600. When the check box 810 is checked, an input field (not illustrated) for information for accessing a link destination CPS is displayed, information for accessing the linked destination CPS is inputted therein and is stored in a CPS ID of the upper limit management table 600. The CPS ID may be, for example, a URL or the like of a link destination CPS.

The above is an example of the user setting screen 800 for the common CPS 115 but will be a description of the user setting screen 800 for the CPS 104 if the "common CPS 115" of the above description is replaced with the "CPS 104". However, if in the CPS 104 a print upper limit setting is not to be linked with that of another CPS, the check box 810 will not be included in the settings and a link destination CPS need not be set.

<Printing Execution Flow>

FIG. 9 illustrates a flow of setting a maximum number of sheets to be printed for when the user performs printing outside of the office using the common CPS 115. However, this is the case for when linkage with another CPS is set to off. In addition, when printing is performed at the office, the flow can be represented by a flow in which the common CPS 115 has been replaced with the CPS 104 and the image forming apparatus 112 has been replaced with the image forming apparatus 101.

In step S901 and step S902, the user inputs information for logging into the common CPS 115 on the client terminal 111 and logs into the common CPS 115. In step S903, the client terminal 111 transmits a print job to the connected common CPS 115. With the processing up to this point, it is possible to store the print job in the common CPS 115. The sequence up to this point and the sequence from this point on are independent of each other and may be executed asynchronously.

In step S904 and step S905, the user inputs information for logging into the common CPS 115 on the image forming apparatus 112 and logs into the common CPS 115.

In step S906, the image forming apparatus 112 makes a print job information list (also referred to as job list) obtainment request to the common CPS 115. In step S907, the common CPS 115 transmits a print job information list to the image forming apparatus and displays a list of print jobs on a display unit 307 of the image forming apparatus 112. In step S908, the user selects a print job to be executed. In step S909, the image forming apparatus 112 requests the common CPS 115 for the print job selected in step S908.

FIG. 10 illustrates an example of a print job list screen for when print jobs that can be selected in step S908 are displayed on the display unit 307 of the image forming apparatus 112. A reference numeral 1000 is a UI for displaying a list of print jobs obtained from the common CPS 115. Print jobs 1021 and 1022 each indicate a print job, and a job name 1001, a print format 1002, a color 1003, a size 1004, a number of pages 1005, and a print job input date and time 1006 are displayed. The print job 1021 or 1022 enters a selected state when the user selects the print job, and regarding the selected print job, the selected state is represented by a change of color, such as the print job 1022.

An option button 1014 is a button for displaying an option setting screen, such as print settings. A select all button 1015 is a button for causing all print jobs to enter the selected state. An update button 1016 is a button for displaying the most recent state of print jobs by performing step S906 and step S907. A return button 1017 is a button for exiting the print job list screen 1000 and returning to the previous screen. A print button 1011, a print+delete button 1012, and a delete button 1013 can be pressed while a print job is selected. The print button 1011 is a button for printing the selected print job, and the print job remains after printing without being deleted. The print+delete button 1012 is a button for printing the selected print job, and the print job is deleted after printing. The delete button 1013 is a button for deleting the selected print job.

FIG. 9 is returned to. In step S910, the common CPS 115 compares a sum of the current number of sheets used for printing (record value) of the upper limit management table 600 stored in the setting management unit 401 and the number of sheets to be printed of the job for which the request was made in step S909 with the maximum number of sheets to be printed (upper limit setting value). If the sum of the current number of sheets used for printing and the number of sheets to be printed of the job for which the request was made in step S909 is less than or equal to the maximum number of sheets to be printed, it is determined that printing is possible. If the sum of the current number of sheets used for printing and the number of sheets to be printed of the job for which the request was made in step S909 exceeds the maximum number of sheets to be printed, it is determined that printing is not possible.

In step S911, if the common CPS 115 determines in step S910 that printing is possible, the job for which the obtainment request has been issued is transmitted to the image forming apparatus 112, and if the common CPS 115 determines that printing is not possible, a cancel instruction is transmitted to the image forming apparatus 112.

In step S912, if a print job is received from the common CPS 115, the image forming apparatus 112 performs printing. Meanwhile, if a cancel instruction is received, a message indicating that the maximum number of sheets to be printed will be exceeded is displayed, and the print processing is ended.

In step S913, if printing has been executed, the image forming apparatus 112 transmits a print result to the common CPS 115. In addition to a success or failure of printing, the print result includes information related to printing, such as the number of printed pages and a paper size.

In step S914, the common CPS 115 stores a cumulative number of printed pages from the print result received from the image forming apparatus 112 in the upper limit management table 600 of the setting management unit 401. When the CPS 104 is used, printing in which the CPS 104 is used can be executed in a manner similar to that of the above description by replacing the common CPS 115 with the CPS 104.

<Print Execution Flow for when Plurality of CPSs are Used>

In the flows of FIGS. 7 and 9, setting of the maximum number of sheets to be printed and determination of a success or failure of printing are performed for each of the common CPS 115 and the CPS 104. In FIG. 11, a method of collectively managing a maximum number of sheets to be printed of the CPS 115 and the CPS 104 for when the common CPS 115 can obtain information from the CPS 104 due to the flow of FIG. 5 will be described. In this case, instead of the user personally performing an authorization setting, the administrator user may collectively perform an authorization setting for all users.

FIG. 11 illustrates a flow of printing for when the maximum number of sheets to be printed is collectively managed by the common CPS 115 and the CPS 104. However, this is the case for when linkage with another CPS is set to on. To manage the maximum number of sheets to be printed collectively, for example, the maximum number of sheets to be printed of the CPS 104 is set in the flow of FIG. 7. In addition, the check box 810 is checked and another CPS (CPS 104 in this example) is specified in setting of the maximum number of sheets to be printed of the common CPS 115. By specifying another CPS (CPS 104 in this example), the common CPS 115 can use the maximum number of sheets to be printed of the specified CPS without managing the maximum number of sheets to be printed. In another way, a configuration in which the common CPS 115 manages the maximum number of sheets to be printed in a centralized manner and another CPS references that can be taken. In such cases, the maximum number of sheets to be printed of the common CPS 115 is set in the flowchart of FIG. 7. In addition, the check box 810 need only be checked and the common CPS 115 need only be specified in setting of the maximum number of sheets to be printed of the CPS 104. A flow for which the common CPS 115 and the image forming apparatus 112 have been replaced with the CPS 104 and the image forming apparatus 101, respectively, in FIG. 11 can represent a processing procedure for that case. Furthermore, rather than treating the CPS 104 or the common CPS 115 as described above, an upper limit management CPS for managing an upper limit of the print amount of each user may be provided in the system and other CPSs 104, 115 may manage upper limits by referencing upper limit values and print records managed by the upper limit management CPS.

In step S1101 and step S1102 of FIG. 11, the user inputs information for logging into the common CPS 115 on the client terminal 111 and logs into the common CPS 115. In step S1103, the client terminal 111 transmits a print job to the logged-in common CPS 115. With the processing up to this point, it is possible to store the print job in the common CPS 115. The sequence up to this point and the sequence from this point on are independent of each other and may be executed asynchronously.

In step S1104 and step S1105, the user inputs information for logging into the common CPS 115 on the image forming apparatus 112 and logs into the common CPS 115.

In step S1106, the image forming apparatus 112 makes a print job information list obtainment request to the common CPS 115.

In step S1107, the common CPS 115 transmits a print job information list to the image forming apparatus and displays a list of print jobs on a display unit 307 of the image forming apparatus 112. The list of jobs to be displayed may be the list illustrated in FIG. 10.

In step S1108, the user selects a print job to be executed. In step S1109, the image forming apparatus 112 requests the common CPS 115 for the print job selected in step S1108.

In step S1110, the common CPS 115 makes a maximum-number-of-sheets-to-be-printed obtainment request to the CPS 104. At this time, the access token obtained in the procedure of FIG. 5 is used to receive access authorization by the CPS 104.

In step S1111, the CPS 104 transmits the maximum number of sheets to be printed stored in the setting management unit 401 to the common CPS 115. The maximum number of sheets to be printed to be transmitted may be the number that has been set for the user logged into the common CPS 115. If a corresponding user is not registered in the CPS 104, something to that effect is returned to the common CPS 115. A response that a corresponding user is not registered in the CPS 104 may be treated as the maximum number of sheets to be printed not having been set for that user.

Here, it is assumed that each user is registered in the CPS 104 and the common CPS 115 under the same user ID. If it is allowed that one user uses a different user ID for each CPS, the user's identity may be determined by separately providing information that associates a plurality of user IDs assigned to one user with each other and referencing the information. The information that associates a plurality of user IDs may be, for example, a table in which user IDs of the respective CPSs for a respective user are associated with each other. The table may be held only by the common CPS or may be held by the respective CPSs.

In step S1112, the common CPS 115 makes a number-of-sheets-used-for-printing obtainment request to the CPS 104. The number of sheets used for printing refers to a print record for a respective user and is a cumulative print amount based on the point in time of initialization. As described above, the number of sheets used for printing may be a cumulative number of printed pages and may further be a cumulative number of printed pages for each category. For example, the maximum number of sheets to be set is the maximum number of sheets in a given period, and after that period has elapsed, the number of sheets used for printing is initialized to zero. Alternatively, for example, the administrator may perform initialization as appropriate.

In step S1113, the CPS 104 transmits the number of sheets used for printing stored in the setting management unit 401 to the common CPS 115.

In step S1114, the common CPS 115 compares the maximum number of sheets to be printed received from the CPS 104 and a total (sum) of the current number of sheets used for printing and the number of sheets to be printed of a job for which a request has been made in step S1109. With this, it is determined whether the number of sheets used for printing exceeds the maximum number of sheets to be printed. If the sum of the current number of sheets used for printing and the number of sheets to be printed of the job for which a request has been made in step S1109 is less than or equal to the maximum number of sheets to be printed, it is determined that the job can be executed (i.e., printed), and if the sum exceeds the maximum number of sheets to be printed, it is determined that printing is not possible.

In step S1115, if the common CPS 115 determines in step S1114 that printing is possible, the job for which the obtainment request has been issued is transmitted to the image forming apparatus 112, and if the common CPS 115 determines that printing is not possible, a cancel instruction is transmitted to the image forming apparatus 112.

In step S1116, if a print job is received from the common CPS 115, the image forming apparatus 112 performs printing, and if a cancel instruction is received, the image forming apparatus 112 displays a message indicating that the maximum number of sheets to be printed is exceeded and ends the print processing.

In step S1117, if printing has been executed, the image forming apparatus 112 transmits a print result to the common CPS 115. In addition to a success or failure of printing, the print result includes information related to printing, such as the number of printed pages and a paper size.

In step S1118, the common CPS 115 transmits the print result received from the image forming apparatus 112 to the CPS 104.

In step S1119, the CPS 104 updates the number of sheets used for printing by adding the number of printed sheets to the number of sheets used for printing included in the print result received from the common CPS 115. The latest cumulative number of printed pages (i.e., print record) is stored in the setting management unit 401.

As in the above FIG. 11, by the common CPS 115 obtaining the information of the CPS 104, the maximum number of sheets to be printed set in the CPS 104 can be used in the common CPS 115. In addition, it becomes possible to manage the total of the number of sheets used for printing of the common CPS 115 and the number of sheets used for printing of the CPS 104 in the CPS 104. With this, it becomes possible to collectively manage the maximum number of sheets to be printed for cases where printing is performed in the common CPS 115 and cases where printing is performed in the CPS 104. In addition, since the maximum number of sheets to be printed and the number of sheets used for printing are managed in a particular CPS in a centralized manner, it is possible to prevent inconsistency between CPSs to be used. In addition, regarding users with a different user ID for each CPS, by associating the user IDs, it is possible to identify the identity of the user and then apply the maximum number of sheets to be printed and the number of sheets used for printing for each user.

Second Embodiment

In the first embodiment, the number of printed pages is included in the print result in both the common CPS 115 and the CPS 104, and the maximum number of sheets to be printed and the number of sheets used for printing (i.e., the total number of printed pages) are compared. In a second embodiment, an example of a method of comparison with the maximum number of sheets to be printed for when properties that are handled as print results are different between the common CPS 115 and the CPS 104 will be described. The configuration and processing that are not explicitly described in particular are assumed to be the same as in the first embodiment.

<Information Handled as Print Result>

FIGS. 12A and 12B illustrate examples of information that the common CPS 115 and the CPS 104 each handle as print results according to the second embodiment.

FIG. 12A is an example of print result information handled in the common CPS 115. In the common CPS 115, a job name 1201, a print format 1202, a color 1203, a size 1204, a number of pages 1205, a print job completion date and time 1206, a number of double-sided sheets 1207 are stored as the print result information. These pieces of information do not depend on the printer manufacturer and are pieces of information handled by an image forming apparatus of any printer manufacturer. The information that can be handled by any printer manufacturer in this way is referred to as a common property below.

FIG. 12B is an example of print result information handled in the CPS 104. In the CPS 105, a job name 1211, a print format 1212, a color 1213, a size 1214, a number of pages 1215, a print job completion date and time 1216, a number of double-sided sheets 1217, and a number of outputted sheets 1218 are stored. Among these, the job name 1211 to the number of double-sided sheets 1217 are common properties and are in common with the print result information of the common CPS 115. The CPS 104 is a CPS provided by a printer manufacturer, and it is assumed that an image forming apparatus of that manufacturer is to be registered. Therefore, in addition to the common properties, the job name 1211 to the number of double-sided sheets 1217, the CPS 104 can handle unique (specific or particular) information for each printer manufacturer. The unique information that is handled for each printer manufacturer in this way is referred to as a unique property below. In FIG. 12B, the number of outputted sheets 1218 corresponds to a unique property. The print result transmitted to a CPS by an image forming apparatus may include a unique property in addition to a common property.

<Setting Flow for when Maximum Number of Sheets to be Printed is Managed as Unique Property>

Figure 13:
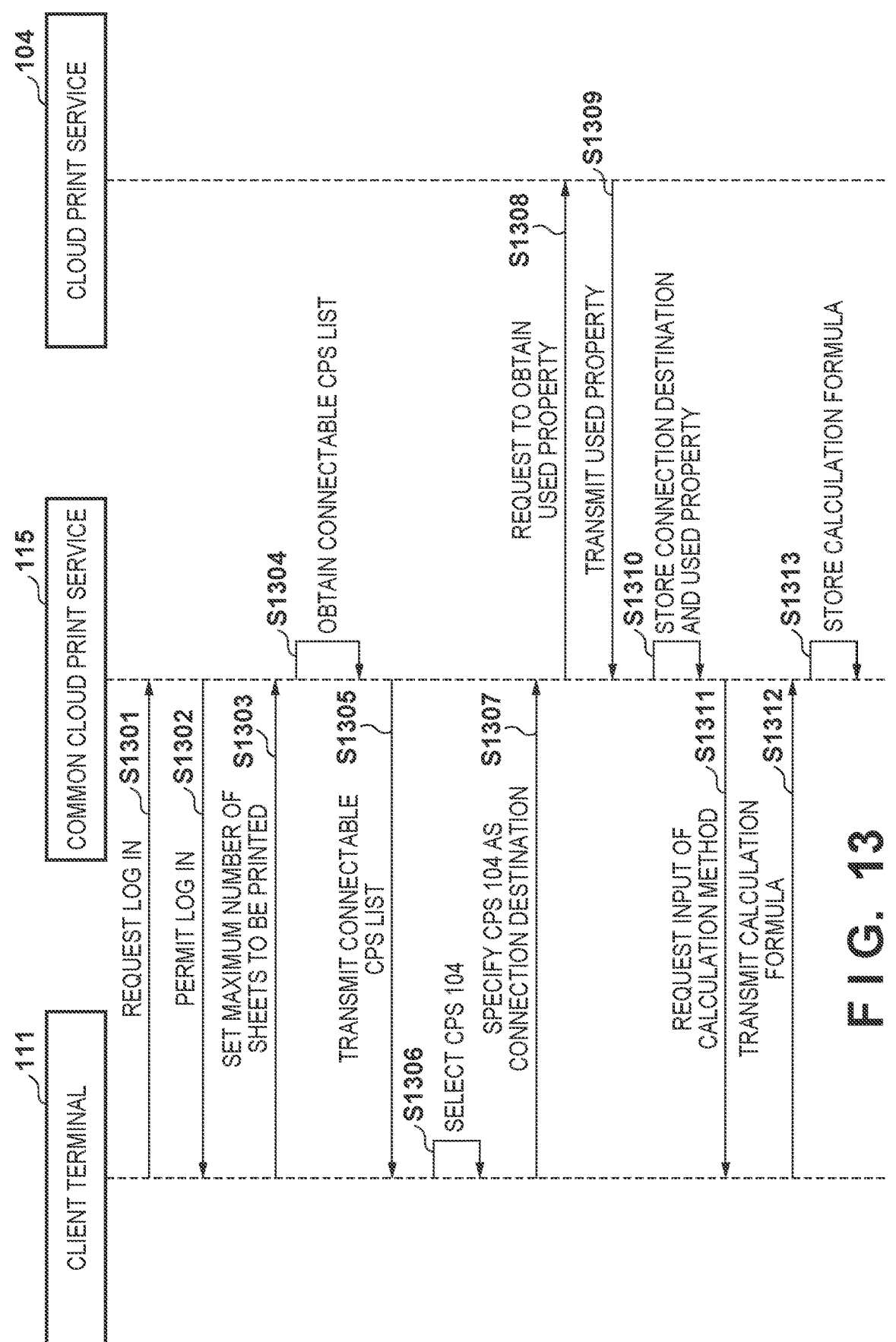
FIG. 13 is a sequence diagram illustrating processing for setting a method of calculating a maximum number of sheets to be printed in the common cloud print service.

FIG. 13 illustrates a flowchart for when another CPS 104 is specified at the time of setting the maximum number of sheets to be printed of the common CPS 115.

In step S1301 and step S1302, the administrator user inputs information for logging into the common CPS 115 on the client terminal 111 and logs into the common CPS 115.

In step S1303, the administrator user sets a maximum number of sheets to be printed from a user setting UI (e.g., see FIG. 8) provided by the UI control unit 406 of the common CPS 115 via the client terminal.

In step S1304, the setting management unit 401 of the common CPS 115 obtains a list of authorized CPSs. An authorized CPS is, for example, a CPS that can be accessed using the access token obtained in the procedure of FIG. 5.

In step S1305, the common CPS 115 transmits the list of CPSs obtained in step S1304 to the client terminal 111.

In step S1306, the administrator user selects the CPS 104 to be connected from a user setting UI (not illustrated) provided by the UI control unit 406 of the common CPS 115. If there are a plurality of CPSs that can be connected to the common CPS 115, the processing from step S1306 onward may be executed for each CPS.

In step S1307, the client terminal 111 specifies the common CPS 115 to connect to the CPS 104 selected in step S1306.

In step S1308, the common CPS 115 requests the CPS 104 to obtain property information used for the maximum number of sheets to be printed. The property used for the maximum number of sheets to be printed is also used for the number of sheets used for printing.

In step S1309, the CPS 104 obtains the property information used for the maximum number of sheets to be printed from the setting management unit 401 and transmits the property information to the common CPS 115. The property information may be, for example, an identifier assigned to each property.

In step S1310, the common CPS 115 stores the information of the connection destination (CPS 104) and the property information used by the connection destination in the setting management unit 401. In addition, it is determined whether the received property information is a common property or a unique property. A common property and a unique property can be identified by, for example, an identifier for each property.

If the property information received in step S1309 is information indicating a common property, the processing for setting a maximum number of sheets to be printed ends. For example, if the maximum number of sheets to be printed is defined by the "number of pages", which is a common property, the processing ends here.

If the property received in step S1309 is information indicating a unique property, the processing proceeds to that of step S1311. For example, if the maximum number of sheets to be printed is defined by the "number of outputted sheets", which is a unique property, the processing from step S1311 on is performed.

In step S1311, the common CPS 115 request the client terminal 111 for input of a method of calculating the maximum number of sheets to be printed and displays a user setting UI (FIG. 14) provided by the UI control unit 406 on the client terminal 111.

Figure 14:
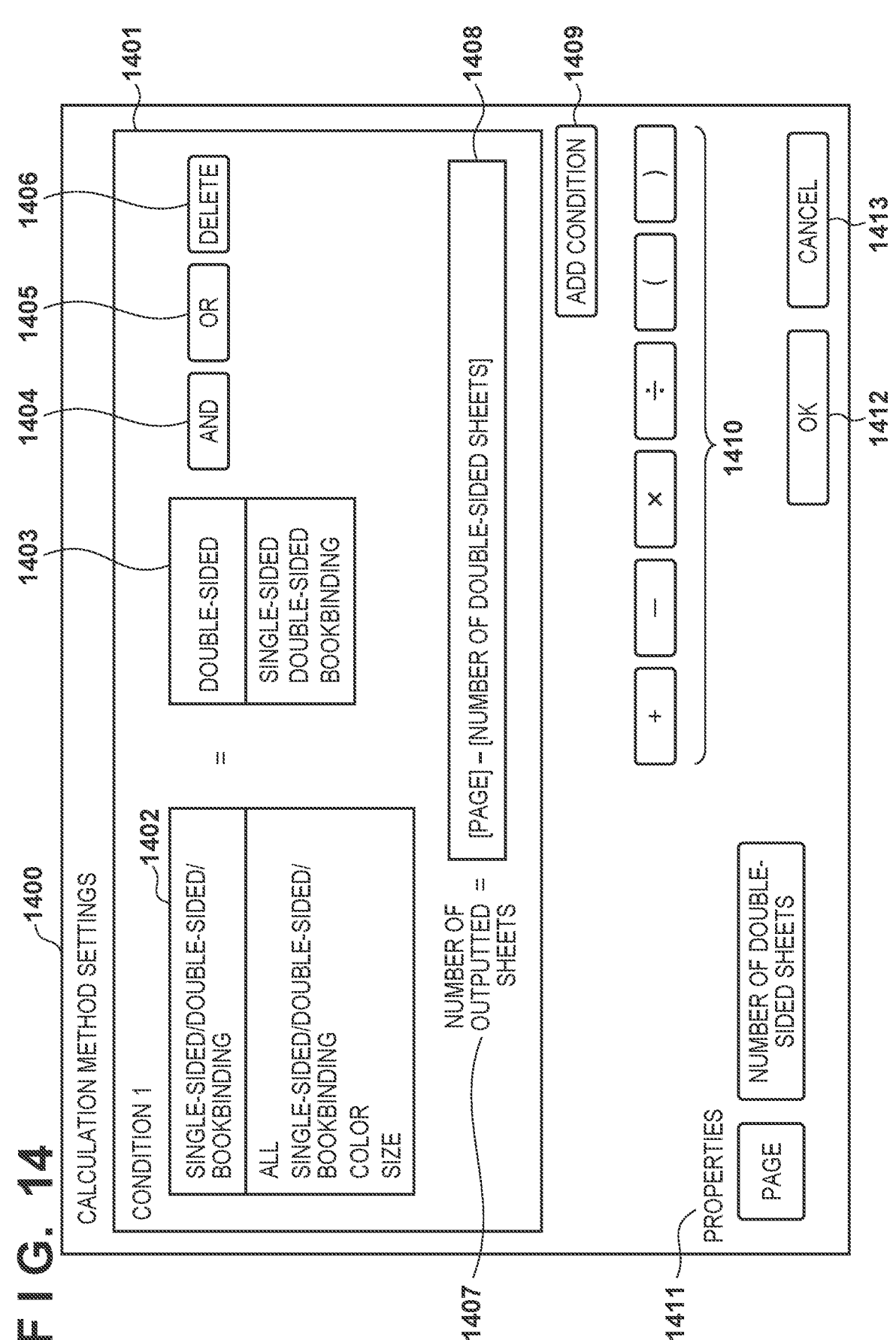
FIG. 14 is a diagram illustrating an example of a UI in which a method of calculating a maximum number of sheets to be printed is set.

FIG. 14 is a diagram illustrating an example of a user interface (UI) to be displayed when the CPS 104 manages the maximum number of sheets to be printed using a unique property. A calculation method setting screen 1400 is a screen for setting a calculation method for when transmitting a print result to the CPS 104 based on a value of a common property if unique property information could not be obtained when the common CPS 115 received the print result from the image forming apparatus.

A condition region 1401 is a region for specifying a condition under which a calculation formula input in a calculation formula region 1408 is to be applied. When adding a condition, the condition region 1401 can be added by a press of an add condition button 1409.

A list box 1402 is a list box for specifying a common property to be used for condition determination. In the list box 1402, a list of common properties whose value are not a numerical value and can be specified as a condition and "all" can be selected. When "all" is selected, calculation is performed using a calculation target property 1407 and a calculation method specified by the calculation formula in the calculation formula region 1408, regardless of the conditions. When "all" is selected, reference numerals 1403 to 1406 are not displayed and the add condition button 1409 will be unselectable. When a condition other than all are set, a method of calculating the maximum number of sheets and the number of used sheets under the set condition is specified.

Regarding a condition list 1403, selection is possible from a list of values that may be assumed by the common property selected in the list box 1402.

When an AND button 1404 is pressed, list boxes similar to the list box 1402 and the condition list 1403 are added, and a condition can be added. At this time, when both the condition set in the list box 1402 and the condition list 1403 and the added condition apply, the value of the calculation target property 1407 is calculated by the calculation method of the calculation formula in the calculation formula region 1408.

When an OR button 1405 is pressed, list boxes similar to the list box 1402 and the condition list 1403 are added, and a condition can be added. At this time, when either the condition set in the list box 1402 and the condition list 1403 or the added condition apply, the value of the calculation target property 1407 is calculated by the calculation method of the calculation formula in the calculation formula region 1408.

A delete button 1406 can delete the condition set in the list box 1402 and the condition list 1403. When there are a plurality of conditions set in the list box 1402 and the condition list 1403, the target condition is deleted. When there is only one condition set in the list box 1402 and the condition list 1403, a state in which "all" is selected in the list box 1402 is entered.

The calculation target property 1407 is a character string representing the property used for the maximum number of sheets to be printed in the CPS 104.

The calculation formula region 1408 is a region for inputting a calculation formula to be used instead of the value of the calculation target property 1407. In a numerical value property list 1411, a list of common properties whose value is numerical is displayed as buttons. These properties can be used in the calculation formula region 1408. A button list 1410 displays a list of symbols that can be used in the calculation formula as buttons. When a "page" button is pressed in the numerical property list 1411, "[page]" is displayed in the calculation formula region 1408. When a "−" button is pressed in the button list 1410, "−" is displayed in the calculation formula region 1408. The calculation formula in the calculation formula region 1408 is created using buttons in the button list 1410 and the numerical property list 1411.

When the calculation formula is inputted and the OK button 1412 is pressed, the calculation method is decided. At this time, if the calculation formula is not inputted in the calculation formula region 1408 or is invalid as a calculation formula, the setting will not be reflected, and an error message (not illustrated) will be displayed, and the screen for setting a method of calculating the maximum number of sheets to be printed is returned to again. If conditions do not cover everything, an error message will similarly be displayed, and the screen for setting a method of calculating the maximum number of sheets to be printed is returned to again. For example, when "single-sided/double-sided/bookbinding" is included in the condition, a calculation formula needs to be defined for each of "single-sided", "double-sided", and "bookbinding" serving as the condition. If there is insufficiency, an error occurs.

When a cancel button 1413 is pressed, the screen for setting a connection destination of step S1306 is returned to without reflecting the setting.

The screen of FIG. 14 indicates an example of specifying a calculation method for double-sided printing. In this case, a method of calculating the number of outputted sheets, which is a unique property, from the number of pages and the number of double-sided pages, which are common properties, is defined. The calculation method setting screen 1400 is an example, and for example, a configuration may be taken so as to allow input of conditions and a calculation formula with regular expressions using variables (common properties) in a UI of a list of common property buttons that allows input of regular expressions.

In step S312, when the OK button 1412 is pressed on the calculation method setting screen 1400, the client terminal 111 transmits the set calculation formula to the common CPS 115.

In step S1313, the common CPS 115 stores the calculation formula received from the client terminal 111 in the setting management unit 401.

By setting a method of calculating the maximum number of sheets to be printed as in the above FIGS. 12A to 14, it is possible to determine, in step S910 and step S914 at the time of printing, that the maximum number of sheets to be printed will be exceeded and update the number of sheets used for printing, respectively, using the calculation formula. Similarly, it is possible to determine, in step S1114 and step S1118 of FIG. 11, that the maximum number of sheets to be printed will be exceeded and update the number of sheets used for printing, respectively, using the set calculation formula. Thus, even if the maximum number of sheets to be printed is managed using a unique property, the maximum number of sheets to be printed is confirmed and the number of sheets used for printing is updated using a common property, without dependency on the printer manufacturer of the image forming apparatus.

<Variation>

The administrator of CPS 104 provided by the manufacturer may know more in detail about the method of calculating the value of a unique property from common properties than the administrator of the common CPS 115. Therefore, a configuration in which the administrative user of the CPS 104 defines the calculation target property and the calculation formula and the common CPS 115 obtains them from the CPS 104 when obtaining the maximum number of sheets to be printed, for example, may be taken.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-034929, filed Mar. 7, 2023 which is hereby incorporated by reference herein in its entirety.

What is claimed is:

1. A printing system comprising:
   a first information processing apparatus including
      at least one memory storing at least one first program, and
      at least one first processor;
   a second information processing apparatus connected with the first information processing apparatus, the second information processing apparatus including
      at least one memory storing at least one second program, and
      at least one second processor; and
   an image forming apparatus connected with the first information processing apparatus,
   wherein the at least one first processor reads the at least one first program from the at least one first memory and executes it to perform a first print service configured to store print jobs,
   the at least one second processor reads the at least one second program from the at least one second memory and executes it to perform a second print service,
   the second print service holds a maximum print amount and a current print amount per a user, and
   the first print service
   when the image forming apparatus executes the print job, obtains the maximum print amount and the current print amount from the second print service,
   determines whether a total of a print amount according to the print job and the current print amount exceeds the maximum print amount, and
   if the total of the print amount according to the print job and the current print amount does not exceed the maximum print amount, causes the image forming apparatus to execute the print job,
   wherein the first print service
   obtains a property to be used as the maximum print amount from the second print service, and
   in a case where the property used as the maximum print amount is a unique property of the second print service, the first print service obtains a print amount using a calculation formula according to a condition under which the calculation formula is to be applied for calculating the maximum print amount and the current print amount from a common property which is in common with the second print service.

2. The printing system according to claim 1, wherein when causing the image forming apparatus to execute the print job, the first print service transmits the print amount according to the print job to the second print service, and
   the second print service adds the print amount according to the print job to the current print amount and updates the current print amount.

3. The printing system according to claim 1, wherein the first print service provides a user interface for setting the calculation formula for calculating the unique property from the common property and the condition under which the calculation formula is to be applied.

4. The printing system according to claim 1, wherein
the maximum print amount and the current print amount
are managed for each user, and
the first print service
obtains from the second print service the maximum print
amount and the current print amount of a user that
causes the image forming apparatus to execute the print
job, and
determines whether the total of the print amount accord-
ing to the print job and the current print amount exceeds
the maximum print amount.

5. The printing system according to claim 4, wherein
the first print service and the second print service identify
an identity of a user by associating a user of the first
print service and a user of the second print service.

6. The printing system according to claim 1, wherein
the first print service is a print service that supports a
setting common to an image forming apparatus and
does not support a setting unique to a manufacturer of
the image forming apparatus, and
the second print service is a print service that supports the
setting unique to the manufacturer of the image form-
ing apparatus.

7. A first information processing apparatus comprising:
at least one memory storing at least one first program; and
at least one first processor, wherein the at least one first
processor reads the at least one first program from the
at least one first memory and executes it to perform:
holding a print job;
when an image forming apparatus connected to the first
information processing apparatus executes the print
job, obtaining a maximum print amount and a current
print amount from a second information processing
apparatus;
determining whether a total of a print amount according
to the print job and the current print amount exceeds the
maximum print amount; and
in a case where the total of the print amount according to
the print job and the current print amount does not
exceed the maximum print amount, causing the image
forming apparatus to execute the print job, wherein
the at least one first processor performs:
obtaining a property to be used as the maximum print
amount from the second information processing appa-
ratus, and
in a case where the property to be used as the maximum
print amount is a unique property of the second infor-
mation processing apparatus, the first information pro-
cessing apparatus obtains a print amount using a cal-
culation formula according to a condition under which
the calculation formula is to be applied for calculating
the maximum print amount and the current print
amount from a common property which is in common
with the second information processing apparatus.

8. The first information processing apparatus according to
claim 7, wherein
when causing the image forming apparatus to execute the
print job, the first information processing apparatus
transmits the print amount according to the print job to
the second information processing apparatus, and
the second information processing apparatus adds the
print amount according to the print job to the current
print amount and updates the current print amount.

9. The first information processing apparatus according to
claim 7, wherein the at least one first processor performs:
providing a user interface for setting the calculation
formula for calculating the unique property from the
common property and the condition under which the
calculation formula is to be applied.

10. The first information processing apparatus according
to claim 7, wherein
the maximum print amount and the current print amount
are managed for each user, and
the at least one first processor performs:
obtaining from the second information processing appa-
ratus the maximum print amount and the current print
amount of a user that causes the image forming appa-
ratus to execute the print job, and
determining whether the total of the print amount accord-
ing to the print job and the current print amount exceeds
the maximum print amount.

11. The first information processing apparatus according
to claim 10, wherein
the first information processing apparatus and the second
information processing apparatus identify an identity of
a user by associating a user of the first information
processing apparatus and a user of the second infor-
mation processing apparatus.

12. The first information processing apparatus according
to claim 7, wherein
the first information processing apparatus is an informa-
tion processing apparatus that supports a setting com-
mon to an image forming apparatus and does not
support a setting unique to a manufacturer of the image
forming apparatus, and
the second information processing apparatus is an infor-
mation processing apparatus that supports the setting
unique to the manufacturer of the image forming appa-
ratus.

13. A method of controlling a printing system including
a first information processing apparatus configured to
provide a first print service that stores a print job,
a second information processing apparatus configured to
provide a second print service connected with the first
information processing apparatus, and
an image forming apparatus connected with the first
information processing apparatus, the method compris-
ing:
the second print service holding a maximum print amount
and a current print amount per a user, and
the first print service
when the image forming apparatus executes the print job,
obtaining the maximum print amount and the current
print amount from the second print service
determining whether a total of a print amount according
to the print job and the current print amount exceeds the
maximum print amount, and
if the total of the print amount according to the print job
and the current print amount does not exceed the
maximum print amount, causing the image forming
apparatus to execute the print job,
wherein the first print service
obtains a property to be used as the maximum print
amount from the second print service, and
in a case where the property used as the maximum print
amount is a unique property of the second print service,
the first print service obtains a print amount using a
calculation formula according to a condition under
which the calculation formula is to be applied for
calculating the maximum print amount and the current print amount from a common property which is in common with the second print service.

14. A non-transitory computer-readable storage medium storing thereon a program which, when loaded into a computer and executed, causes the computer to execute a process, the process comprising:

a first information processing apparatus holding a print job;

when an image forming apparatus connected to the first information processing apparatus executes the print job, obtaining a maximum print amount and a current print amount from a second information processing apparatus;

determining whether a total of a print amount according to the print job and the current print amount exceeds the maximum print amount, and if the total of the print amount according to the print job and the current print amount does not exceed the maximum print amount, causing the image forming apparatus to execute the print job, wherein the first information processing apparatus performs:

obtaining a property to be used as the maximum print amount from the second information processing apparatus, and in a case where the property to be used as the maximum print amount is a unique property of the second information processing apparatus, the first information processing apparatus obtains a print amount using a calculation formula according to a condition under which the calculation formula is to be applied for calculating the maximum print amount and the current print amount from a common property which is in common with the second information processing apparatus.

* * * * *